J. T. JETER.
Harvester Dropper.
No. 197,138. Patented Nov. 13, 1877.
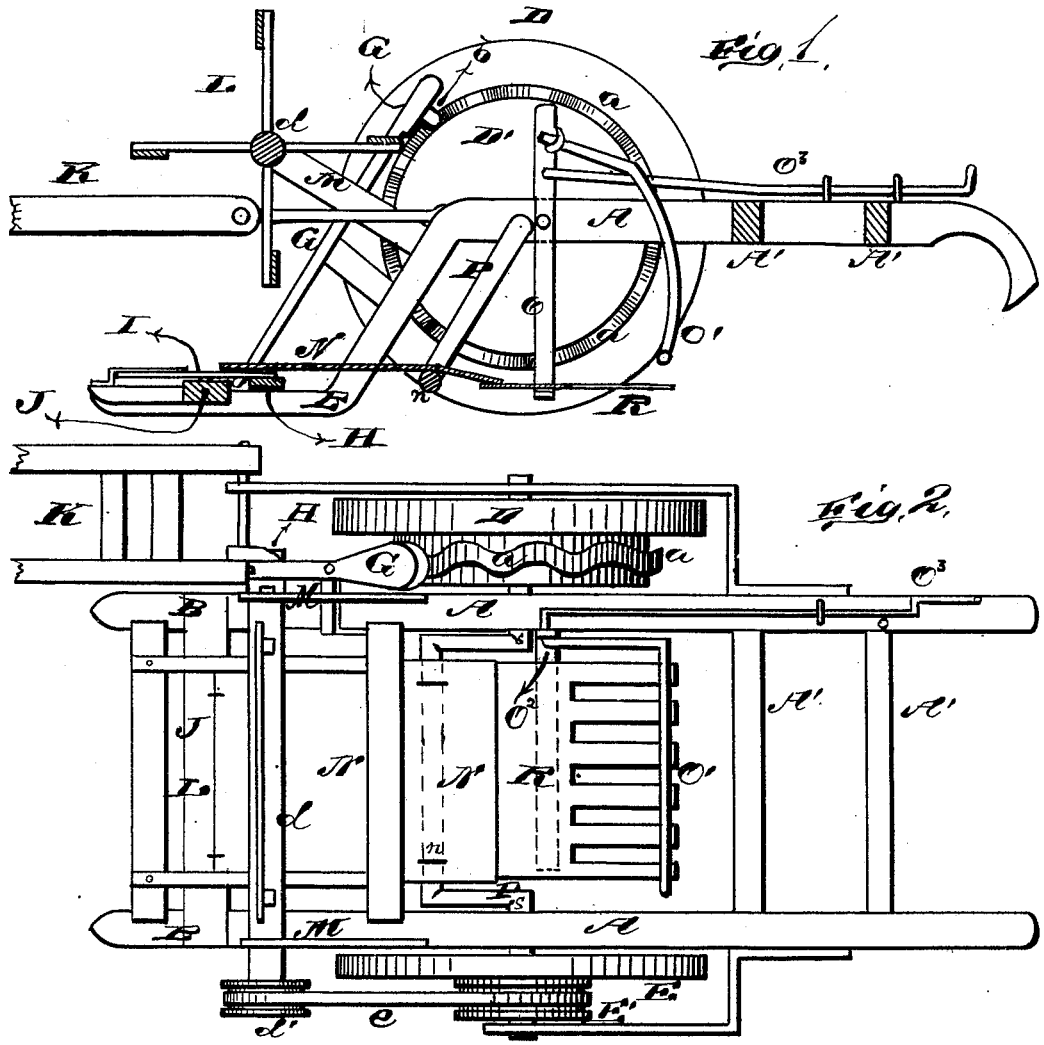

UNITED STATES PATENT OFFICE.

JOHN T. JETER, OF JACKSONVILLE, ALABAMA.

IMPROVEMENT IN HARVESTER-DROPPERS.

Specification forming part of Letters Patent No. 197,138, dated November 13, 1877; application filed July 28, 1877.

*To all whom it may concern:*

Be it known that I, JOHN T. JETER, of Jacksonville, in the county of Calhoun and State of Alabama, have invented a new and valuable Improvement in Harvesters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a part sectional side elevation of my harvester, and Fig. 2 a plan view of the same.

The nature of my invention consists in the construction and arrangement of a harvester, as will be hereinafter more fully set forth.

The annexed drawings, to which reference is made, fully illustrate my invention.

The frame of my harvester is composed of two parallel side beams, A A, the front ends of which are curved downward, and then turned forward, forming the shoes B B at the ends of the cutter-bar. The rear ends of the side beams are curved in proper shape to form handles for the driver to manipulate the harvester while walking behind. A′ A′ are simply cross-bars connecting the side beams A A.

D and E are the driving-wheels, one on each side of the frame. The wheel D is, on its inner side, provided with a wheel or roller, D′, having upon its periphery a raised zigzag or serpentine cam, $a$, extending entirely around the wheel.

G represents a lever, pivoted to an arm projecting from the frame in front of the wheel D′. On the upper end of the lever G are two studs, with rollers $b$ $b$ straddling the cam $a$ on the wheel D′. Thus, when said wheel revolves, the lever obtains a vibratory motion. The lower end of the lever is connected to a bar, H, to which the rear ends of the diamond-shaped cutters I I are connected. These cutters are pivoted through their centers on the top of the cutter-bar J, and cut both ways while being worked upon their pivots by the lever G and bar H.

In front of the wheel D are shafts K, for the attachment of the horse for pulling the machine.

The wheel E is, on its hub, formed with a pulley, E′, which is, by a cord or belt, $e$, connected with a pulley, $d'$, on the end of the shaft $d$ of the reel L, said reel-shaft being supported in arms M M, projecting from the harvester-frame.

The reel L throws the cut grain backward over an apron, N. The apron N is made of leather or other suitable flexible material, and is attached at its front end to the cutter-bar, while its rear end is passed over and attached to the lower horizontal part $n$ of the double-crank axle P. The upper horizontal ends $s$ $s$ of the double-crank axle pass through the beams A, and form the axles of the wheels D and E.

By the employment of an axle having a double crank, as described, with the horizontal part $n$ lying in, or nearly in, the plane of the cutters, a support for the rear end of the apron N is obtained, while the upper horizontal ends $s$ serve the purposes of an axle for the wheels D E.

The function of the double-crank axle, therefore, is twofold. It serves as an axle for the wheels, and also as a support for the rear end of the apron N, which is preferably made flexible, to yield somewhat to any movement of the axle.

To the rear end of the apron N is attached a slotted plate, R, which rides over the stubble.

O represents a lever, pivoted to one of the beams A of the machine, and having an arm, $O^2$, bent at right angles thereto, and lying under the slotted plate R. $O^1$ is a cut-off, attached to the arm O, and $O^3$ is a rod, by means of which the cut-off and the arm O are operated.

The operation of the machine is as follows: The slotted plate R is held upward by the arm $O^2$ until a gavel is collected, when it is thrown downward by the rod $O^3$, the stubble carrying off the gavel from the slotted plate R, and the cut-off $O^1$ holding the cut grain until the plate R is elevated to receive another gavel.

What I claim as new, and desire to secure by Letters Patent, is—

An axle, P, having the bent portions thereof extended below and supporting a flexible apron or grain-platform, N, to which the slotted plate R is hinged, in combination with the arm O, pivoted to the frame, and carrying at its lower end the supporting-arm $O^2$ of the slotted frame, and near its upper end the cut-off $O^1$, substantially as described, and for the purpose set forth.

In testimony that I claim the above I have hereunto subscribed my name in the presence of two witnesses.

JOHN T. JETER.

Witnesses:
 R. D. WILLIAMS,
 W. O. HUTCHINSON.